July 4, 1950     D. L. COVEY     2,513,847
PIN FASTENER
Filed March 4, 1947

INVENTOR.
DEWEY L. COVEY
BY
AGENT

Patented July 4, 1950

2,513,847

UNITED STATES PATENT OFFICE 2,513,847

PIN FASTENER

Dewey L. Covey, San Diego, Calif.

Application March 4, 1947, Serial No. 732,269

1 Claim. (Cl. 24—155)

My invention relates to a fastener, more particularly for use in connection with fabric materials or the like and the objects of my invention are:

First, to provide a fastener of this class which may be used in connection with cuff links, tie clasps, lapel buttons or other emergency fastenings;

Second, to provide a fastener of this class which may be used in connection with costume jewelry, identification discs for luggage or studs for upholstering leather;

Third, to provide a fastener of this class which is particularly adapted for use in holding papers together;

Fourth, to provide a fastener of this class which is very useful in connection with various fabric materials or the like and may be used as a shirt button or for similar other uses as desired;

Fifth, to provide a fastener of this class in which spaced plates are interconnected by an angular pin which may be varied in length for increasing or decreasing the spaced relation of said plate when manufactured for the purpose of retaining there-between different materials of different thickness;

Sixth, to provide a fastener of this class which may be made very small and neat or may be made large enough to handle relatively heavy materials;

Seventh, to provide a fastener of this class having two disc-shaped plates, one of which may be made smaller than the other for providing firm holding at one side and a neat small face at the other side for ornamental purposes if desired;

Eighth, to provide a fastener of this class which is very safe and strong;

Ninth, to provide a fastener of this class which may be quickly and easily fastened or removed;

Tenth, to provide a fastener of this class which may be secured in connection with delicate materials with least possible damage to said materials; and Eleventh, to provide a fastener of this class which is very simple and economical of construction, efficient in operation and which will not readily deteriorate or get out of order.

Figure 1:
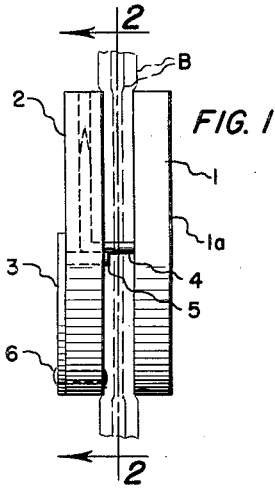
Figure 2:
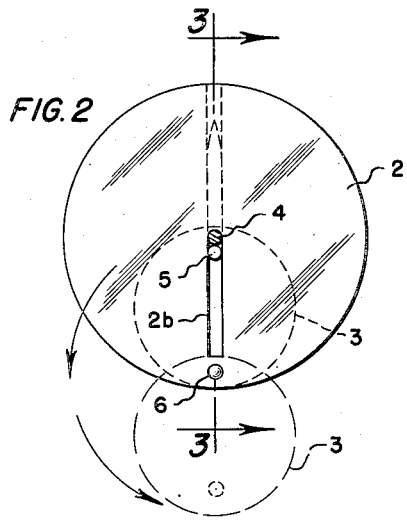
Figure 3:
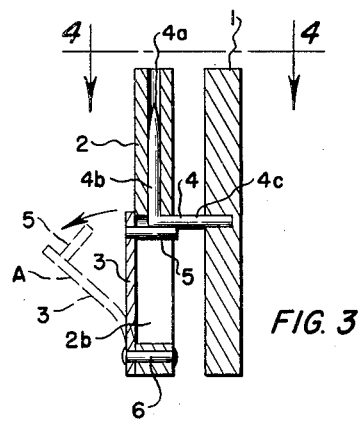
Figure 4:
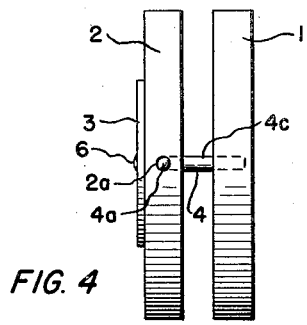
Figure 5:
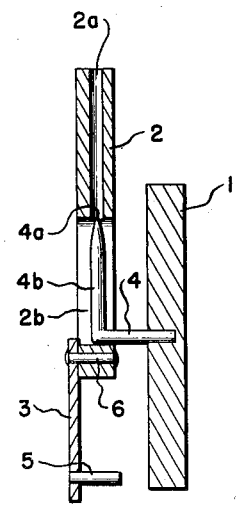

With these and other objects in view, as will appear hereinafter, my invention consists of certain novel features of construction, combination and arrangement of parts and portions as will be hereinafter described in detail and particularly set forth in the appended claim, reference being had to the accompanying drawing and to the characters of reference thereon forming a part of this application in which:

Fig. 1 is an edge elevational view of my fastener; Fig. 2 is a sectional view thereof taken from the line 2—2 of Fig. 1; Fig. 3 is a transverse sectional view taken from the line 3—3 of Fig. 2 showing parts in elevation to facilitate the illustration; Fig. 4 is an edge elevational view of my fastener taken from the line 4—4 of Fig. 3; and Fig. 5 is a sectional view of my fastener taken on a plane substantially the same as that shown in Fig. 3 of the drawing showing the latch plate of my fastener pivoted substantially 180 degrees from that as shown in Fig. 3 and showing my fastener in a position ready to be assembled.

Similar characters of reference refer to similar parts and portions throughout the several views of the drawing.

The plates 1 and 2, latch plate 3, pin 4, latch pin 5 and the bearing pin 6 constitute the principal parts and portions of my fastener.

The plates 1 and 2 are preferably substantially disc-shaped plates but may be made of substantially flat material having varying external form as desired. The plate 1 is a substantially solid flat plate member having an angular pin 4 rigidly secured in connection therewith and this pin 4 extends laterally from the plate 1 and is provided with a portion extending parallel to the inner plane of the plate 1 and terminating in a point portion 4a. The portion 4b parallel to the inner plane of the plate 1 and terminating in the point portion 4a is adapted to be positioned in the bore portion 2a of the plate 2, as shown best in Fig. 3 of the drawing, when my fastener is in latched position. The laterally extending portion 4c of the pin 4 is positioned in a slotted portion 2b of the plate 2 at the inner terminus of the bore portion 2a. This slotted portion 2b is slightly longer than the portion 4b of the pin 4 parallel to the inner plane of the plate 1 permitting said portion 4b to be inserted into the slot 2b, as shown in Fig. 1 of the drawing, prior to insertion of said portion 4b of said pin 4 into the bore 2a communicating with said slotted portion 2b, all as shown best in Fig. 5 of the drawing. The latch plate 3 is a very thin resilient member preferably made of spring steel and this latch plate 3 is pivoted on the bearing pin 6 extending through the plate 2 near one end of the slotted portion 2b therein opposite the bore portion 2a. This latch plate 2 is arranged to be deflected, as indicated by dash lines A in Fig. 3 of the drawing, whereby the latch pin 5 rigidly connected with said latch plate 3 is moved out of the slotted portion 2b of the plate 2 permitting removal of the portion 4b of the pin 4a from the bore portion 2a and into the slotted portion 2b, as shown in Fig. 5 of the drawing, permitting the reverse operation when assembling my fastener. As shown in Figs. 2 and 5 of the drawing, the latch plate 3 is pivoted on the bearing pin 6 completely out of interference with the slotted portion 2b when desired.

The operation of my fastener is substantially as follows:

When it is desired to fasten the plates 1 and 2 on opposite sides of fabric material or other similar material as indicated by dash lines B in Fig. 1 of the drawing, said material is first pinned on the pin 4 and placed on the laterally extending portion 4c thereof, then the angular portion 4b is placed in the slotted portion 2b of the plate 2 when in position as shown in Fig. 5 of the drawing, then said angularly extending portion 4b is forced into the bore 2a of the plate 2 whereupon the latch plate 3 may be pivoted on the bearing pin 6 until the latch pin 5 aligns with the slotted portion 2b and this is accomplished by deflecting said latch plate 3, as shown by dash lines A in Fig. 3 of the drawing. The resilient character of the latch plate 3 then forces the latch pin 5 into engagement with the laterally extending portion 4c of the pin 4 maintaining the angularly disposed portion 4b of the pin 4 in the bore portion 2a of the plate 2. It will be here noted that the plate 1 is provided with a face portion 1a which may be provided with ornamental features if desired and this plate 1 may be smaller or larger in diameter than the plate 2 providing the proper face desired. The plate 2 is normally at the rear side of the materials being connected together and the point portion 4a of the pin 4 is entirely enclosed in the plate 2 preventing the person employing the fastener from being wounded in any way. This fastener is very strong due to the fact that the laterally extending portion 4c of the pin 4 is placed in tension when force is applied tending to separate the plates 1 and 2. It will be noted that very thick materials or a plurality of pieces may be connected together by simply manufacturing the laterally extending portion 4c of the pin 4 fairly long, thus spaced relation of the plates 1 and 2 may be predetermined by the length of said laterally extending portion 4c for handling a variety of thicknesses of materials being held together by my fastener. The size of this fastener may be proportionate to the use to which it is put and therefore my fastener is very versatile. It will be here noted that the plate 1 may be provided with a plurality of the pins 4 and that the latch member 3 may be provided with a plurality of the latch pins 5 and that the plate 2 may be provided with a plurality of bore portions 2a and slotted portions 2b so that increased pin bearing in material may be provided if desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In a fastener of the class described the combination of a pair of fastener members arranged to be secured together in spaced relation to each other, one of said fastener members having an L-shaped pin rigidly connected therewith provided with a portion substantially parallel to and spaced from the plane of said plate, the other plate having a bore portion therein arranged to receive said pin substantially parallel to the plane of said plate to which said pin is connected and a resilient latch member pivoted to said other plate in spaced relationship with said bore, a latch pin in connection with said latch plate arranged to engage said first-mentioned pin at its L-shaped portion for holding the same in said bore.

DEWEY L. COVEY.

REFERENCES CITED

The following references are of record in the file of this patent:

UNITED STATES PATENTS

| Number | Name | Date |
| --- | --- | --- |
| 259,972 | Alderman | June 20, 1882 |
| 687,028 | Horning | Nov. 19, 1901 |
| 950,289 | Horning | Feb. 22, 1910 |
| 1,050,552 | Kurek | Jan. 14, 1913 |
| 1,240,381 | Smith | Sept. 18, 1917 |
| 1,357,035 | Dobrovits | Oct. 26, 1920 |
| 1,419,104 | Becker | June 6, 1922 |
| 2,073,602 | Beach | Mar. 16, 1937 |